US006344641B1

(12) United States Patent
Blalock et al.

(10) Patent No.: US 6,344,641 B1
(45) Date of Patent: Feb. 5, 2002

(54) SYSTEM AND METHOD FOR ON-CHIP CALIBRATION OF ILLUMINATION SOURCES FOR AN INTEGRATED CIRCUIT DISPLAY

(75) Inventors: Travis N. Blalock, Charlottesville, VA (US); Ken A. Nishimura, Fremont, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

(21) Appl. No.: 09/372,359

(22) Filed: Aug. 11, 1999

(51) Int. Cl.[7] ............................ G01J 1/32; H05B 37/02
(52) U.S. Cl. ........................ 250/205; 315/156; 327/514
(58) Field of Search ............................ 250/205, 214 R; 327/514; 315/156, 158, 159; 345/63; 349/61

(56) References Cited

U.S. PATENT DOCUMENTS 4,352,013 A * 9/1982 Fasig et al. ............. 250/223 R
5,769,384 A 6/1998 Baumgartner et al. .. 250/214 A
5,977,717 A * 11/1999 Dean .......................... 250/205
6,207,943 B1 * 3/2001 Smelker ..................... 250/205

* cited by examiner

*Primary Examiner*—Stephone B. Allen

(57) ABSTRACT

An on-chip system and method for calibrating an illumination source includes a photo-detector and intensity sense and control circuitry resident on an integrated circuit. The integrated circuit is illuminated by an illumination source, which impinges upon the photo-detector. The intensity sense and control circuitry receives the measured intensity value of the illumination source and compares the measured intensity to a predetermined value representing the desired intensity. Subject to a range of operation, the intensity sense and control circuitry adjusts the intensity of the illumination source based upon the difference between the measured illumination intensity and the desired illumination intensity.

13 Claims, 5 Drawing Sheets

SYSTEM AND METHOD FOR ON-CHIP CALIBRATION OF ILLUMINATION SOURCES FOR AN INTEGRATED CIRCUIT DISPLAY

TECHNICAL FIELD

The invention relates generally to displays, and, more particularly, to a system and method for the on-chip calibration of illumination sources for an integrated circuit display.

BACKGROUND OF THE INVENTION

A new integrated circuit micro-display uses illumination sources that are directed toward a reflective imaging element to provide high quality image reproduction. A typical color micro-display has red, green and blue light-emitting diode (LED) light sources, although other illumination sources are possible. Often, each color source is composed of multiple LEDs generating light of the same nominal wavelength, spatially arrayed to produce a uniform illumination field. Commercially-available LEDs, which are nominally manufactured to the same specifications, typically exhibit a significant amount of mismatch relative to each other, regarding both turn-on voltage and intensity vs. current characteristics. Furthermore, the light output of LEDs manufactured to the same specifications may vary due to factors such as aging of the device and the temperature at which the device is stored and operated.

Unfortunately, this mismatch requires that the illumination sources of each micro-display module be calibrated at the time of manufacture. The illumination sources may be calibrated by, for example, trimming the circuit driving each LED, or programming a non-volatile memory associated with the display. These “per unit” adjustments add significantly to the manufacturing cost of each micro-display. Furthermore, calibration at the time of manufacture fails to address the problem of long term LED mismatch due to aging and/or temperature variations.

Therefore, it would be desirable to incorporate continuous, automatic calibration of the illumination sources directly onto the device that forms the imaging element of the micro-display.

SUMMARY OF THE INVENTION

The invention provides a system and method for the on-chip calibration of illumination sources for an integrated circuit micro-display.

The invention can be conceptualized as a method for calibrating an illumination source, the method comprising the following steps: providing an integrated circuit including at least one photo-detector and an intensity sense and control circuit; illuminating the one photo-detector using the illumination source; measuring an intensity of the illumination source using the photo-detector; communicating the intensity to the intensity sense and control circuit; and adjusting the illumination source to a predetermined level using the intensity sense and control circuit.

In architecture, the invention provides a system for calibrating an illumination source, comprising: an integrated circuit including an imaging array and a photo-detector; an illumination source optically coupled to the imaging array; and circuitry resident on the integrated circuit, the circuitry including intensity sense circuitry coupled to the photo-detector and control circuitry coupled to the illumination source.

The invention has numerous advantages, a few which are delineated below merely as examples.

An advantage of the invention is that it allows for the on-chip calibration of the illumination sources for a micro-display.

Another advantage of the invention is that it allows an illumination source to compensate for ambient light variations that may affect a micro-display.

Another advantage of the invention is that it significantly reduces manufacturing cost of a micro-display.

Another advantage of the invention is that it allows a fully integrated illumination source driver to reside on the same device as a micro-display.

Another advantage of the invention is that it helps reduce the effects of aging on an illumination source.

Another advantage of the invention is that it improves image quality in a micro-display.

Another advantage of the invention is that it is simple in design and easily implemented on a mass scale for commercial production.

Other features and advantages of the invention will become apparent to one with skill in the art upon examination of the following drawings and detailed description. These additional features and advantages are intended to be included herein within the scope of the invention.

BRIEF DESCRIPTION OF THE DRAWINGS

The invention, as defined in the claims, can be better understood with reference to the following drawings. The components within the drawings are not necessarily to scale relative to each other, emphasis instead being placed upon clearly illustrating the principles of the invention.

DETAILED DESCRIPTION OF THE PREFERRED EMBODIMENT

While the following description will include reference to discrete elements and circuit blocks, portions of the system and method for on-chip calibration of illumination sources for a micro-display may be implemented on a single silicon die. Furthermore, while the following description will refer to a reflective micro-display, the invention is equally applicable to other types of displays, including but not limited to, emissive displays.

Figure 1:
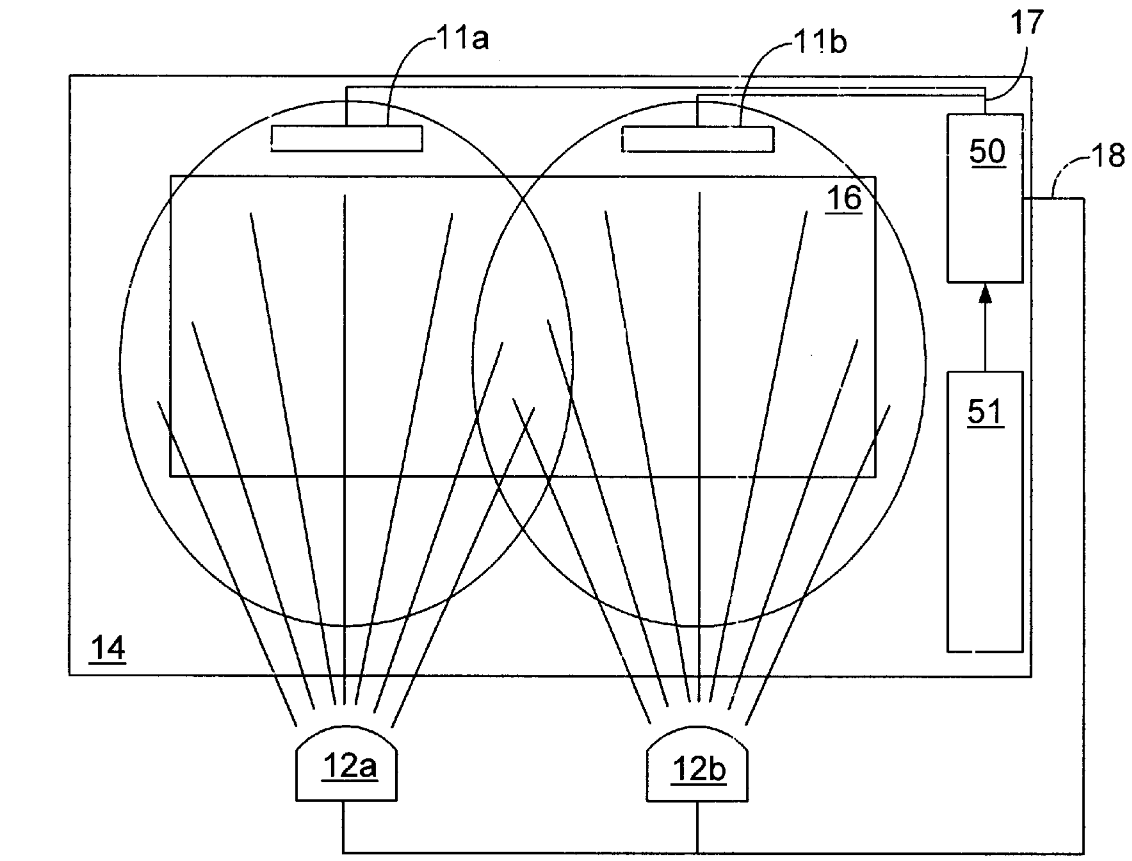
FIG. 1 is a schematic view illustrating a micro-display including the on-chip calibration circuitry of the invention.

Turning now to the drawings, FIG. 1 is a schematic view illustrating a micro-display system 10, including illumination sources 12*a* and 12*b*, micro-display device 14 and intensity sense and control circuit 50 constructed in accordance with the invention. Micro-display device 14 is constructed in accordance with that disclosed in co-pending, commonly assigned U.S. patent application entitled “Electro-Optical Material-Based Display Device Having Analog Pixel Drivers,” filed on Apr. 30, 1998, assigned Ser. No. 09/070,487, the disclosure of which is incorporated herein by reference. In the above-mentioned micro-display device 14, illumination sources 12*a* and 12*b,* are located remotely from the micro-display device 14, and are used to illuminate the micro-display device 14, which uses a substrate to direct light towards a viewer of the device. Micro-display device 14 includes imaging array 16, which includes an array of pixels (not shown) that are illuminated by illumination sources 12*a* and 12*b*. Illumination sources 12*a* and 12*b* may be light emitting diodes (LEDs). Although shown in the preferred embodiment as using LEDs to illuminate imaging array 16, other illumination sources may be used in accordance with the concepts of the invention.

In accordance with the invention, micro-display device 14 includes intensity sense and control circuit 50, which provides continuous on-chip calibration of illumination sources 12*a* and 12*b*. Micro-display device 14 can be, for example, an integrated circuit. Intensity sense and control circuit 50, includes various electronic circuitry, and receives input from photo-detectors 11*a* and 11*b* regarding the intensity of illumination sources 12*a* and 12*b*. Photo-detectors 11*a* and 11*b* may be constructed in accordance with that disclosed in commonly assigned U.S. Pat. No. 5,769,384, entitled LOW DIFFERENTIAL LIGHT LEVEL PHOTORECEPTORS and issued on Jun. 23 1998 to Baumgartner et al. While illustrated using two illumination sources, 12*a* and 12*b,* and two photo-detectors, 11*a* and 11*b,* the concepts of the invention are applicable to systems in which a greater or lesser number of illumination sources and photo-detectors is used. Furthermore, the number of sensors may be lesser or greater than the number of illumination sources if the illumination sources are temporally modulated. In a practical embodiment, imaging array 16 is composed of, for example, 1024×768 pixels. However, imaging array 16 may be composed of any other acceptable two-dimensional arrangement of pixels.

In micro-display system 10, each photo-detector is aligned with an illumination source. As mentioned above, it is not necessary that the photo-detectors be aligned with the illumination sources. The photo-detectors and illumination sources are depicted in that manner for purposes of illustration. In the embodiment illustrated, photo-detectors 11*a* and 11*b* are used to measure the intensity of illumination sources 12*a* and 12*b,* respectively. The measured intensity is communicated via connection 17 to intensity sense and control circuit 50. Intensity sense and control circuit 50 is also resident on micro-display device 14, and operates to increase or decrease the drive current to illumination source 12*a* and illumination source 12*b,* via connection 18, as necessary to keep the light intensity incident on the micro-display device 14 at a system specified level. Intensity sense and control circuit 50 will be described in greater detail below with reference to FIG. 3. Controller 51 provides timing and control signals to intensity sense and control circuit 50.

One of the benefits of the invention is that the intensity sense and control circuitry 50 and controller 51 can be fabricated at the same time and using the same fabrication processes as those used to fabricate the imaging array 16, thus minimizing the resources necessary to construct the invention. Furthermore, the intensity sense and control circuitry 50 and controller 51 can be fabricated integrally with imaging array 16 on the same substrate.

Figure 2:
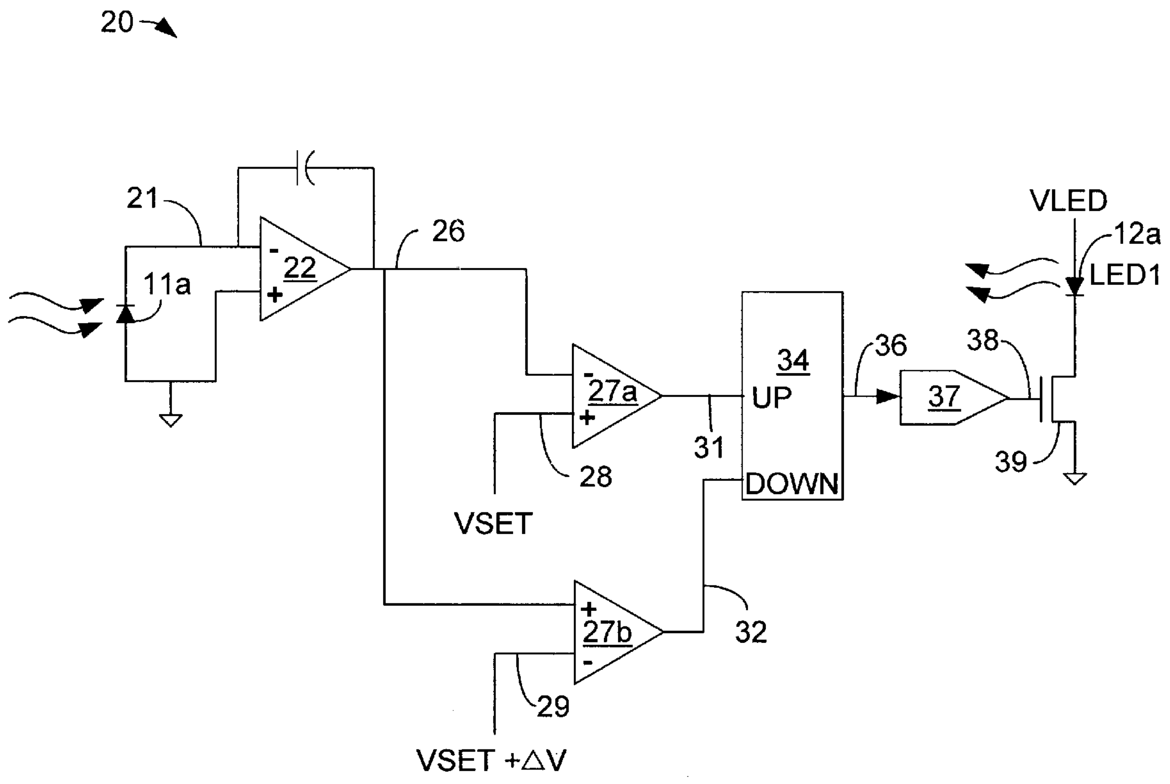
FIG. 2 is a simplified functional block diagram illustrating the invention.

For the reasons mentioned above, it is desirable to have the ability to calibrate and control the intensity of each illumination source. For example in a color display system having red, green and blue LEDs, it may be desirable to calibrate the output of each red, green and blue LED so that the outputs, when combined, form white light. In this example, unless each LED is calibrated to provide the appropriate intensity of light, combining the red, green and blue light may not provide the desired white light. The white balance should be maintained at all intensities of the white light. For example, unless all three LEDs are balanced, the light intensity changes due to variations in the temperature of each LED will likely result in white light that has an incorrect white balance. FIG. 2 is a simplified functional block diagram 20 illustrating the invention.

In accordance with the invention, photo-detector 11*a,* which is illustrated schematically as a photo-diode that generates a current, but may be any device capable of converting light impinging on it into an electrical signal, receives light from LED 12*a*. Photo-detector 11*a* produces a current that is proportional to the number of photons impinging upon it from LED 12*a*. Operational amplifier 22, which is configured as an integrator in this application, receives the current from photo-detector 11*a* and integrates it during a specified time to produce an output voltage on connection 26. The voltage is proportional to the intensity of light impinging upon photo-detector 11*a* and represents the charge supplied by photodetector 11*a*.

The output of integrator 22 is supplied to comparators 27*a* and 27*b*. This value represents the average light intensity at the photo-detector over the measuring period. Comparators 27*a* and 27*b* form a window comparator, which compares the value of the signal on connection 26 with a set point value VSET. The set point value is an analog value that represents the desired intensity of the illumination source, in this case, LED 12*a*. The set point value supplied to comparator 27*b* over connection 29 includes the value VSET plus an offset voltage $\Delta V$, which is used to determine a range within which no adjustment of the illumination source is performed. The set point value may be adjusted to control the brightness of the display.

Comparator 27*a* compares the measured intensity of LED 12*a,* which is supplied over connection 26 from integrator 22 with the desired intensity represented by the VSET signal over connection 28. Depending upon the relative value of these two signals, the output of comparator 27*a* will either be a logic high or a logic low. For example, if the voltage representing the measured intensity is less than the value of VSET, then the output of comparator 27*a* will be a logic high. Conversely, if the voltage representing the measured intensity is greater than the set point value VSET, the desired intensity, then the output of comparator 27*a* will be a logic low. Comparator 27*b* operates in the opposite sense to comparator 27*a*.

Prior to discussing the remainder of the circuit, a brief description of the function of the set point values VSET+$\Delta V$ supplied to the comparator 27*b* will be provided. Essentially, comparators 27*a* and 27*b* form a window comparator. This means that the output voltage range of the integrator 22 includes a region, defined by the offset voltage $\Delta V$ added to the set point value VSET, within which neither comparator 27*a* nor 27*b* provides a logic high output. A window comparator is used because it is undesirable to correct the intensity of the LED 12*a* when the voltage representing the measured intensity is at or close to the set point VSET.

The output of comparators 27*a* over connection 31 and the output of comparator 27*b* over connection 32 are supplied to counter 34. A logic high signal over connection 31 causes counter 34 to increment and a logic high signal over connection 32 causes counter 34 to decrement. When neither comparator 27*a* nor 27*b* provide a logic high output, i.e., when the output of the integrator 22 is within $\Delta V$ of the set point value VSET, the state of counter 34 remains unchanged.

To illustrate, assume that the intensity of the light generated by LED 12*a* was too low when measured by photo-detector 11*a*. In such a case, the output of integrator 22 which is supplied to comparator 27*a* over connection 26 is lower than the set point value VSET on connection 28. This condition dictates that the output of comparator 27*a* will be a logic high, which will cause counter 34 to increment. When counter 34 increments, the output 36 of counter 34 increases the digital value that is provided to DAC 37 over connection 36. The signal on connection 36 is an n-bit digital word representing the current used to drive illumination source 12*a*. The analog output of DAC 37 over connection 38 directly drives LED 12*a* via current source MOSFET transistor 39. Therefore, as the output of DAC 37 increases, the current through transistor 39 will increase, thus increasing the intensity of the light generated by LED 12*a*.

Alternatively, were the light generated by LED 12*a* too bright, then the output of integrator 22 would be greater than the set point value VSET on connection 28, thereby causing the output of comparator 27*a* to be a logic low and the output of comparator 27*b* to be a logic high provided that the output of integrator 22 is greater than the value of VSET+ΔV. In the above-mentioned example in which the light generated by LED 12*a* is too bright, the output of comparator 27*b* will be a logic high on connection 32. This causes counter 34 to decrement. When the output of counter 34 on connection 36 decrements, the input to DAC 37 is reduced. This causes DAC 37 to reduce the amount of current flowing through LED 12*a,* thus reducing the intensity of the light generated by LED 12*a*.

Finally, were LED 12*a* near the desired brightness, the output of integrator 22 would be within ΔV of the set point value VSET, neither the output of comparator 27*a* nor the output of comparator 27*b* would be at logic high. In such case, the output of counter 34 and the operating condition of the circuit remain unchanged.

Figure 3:
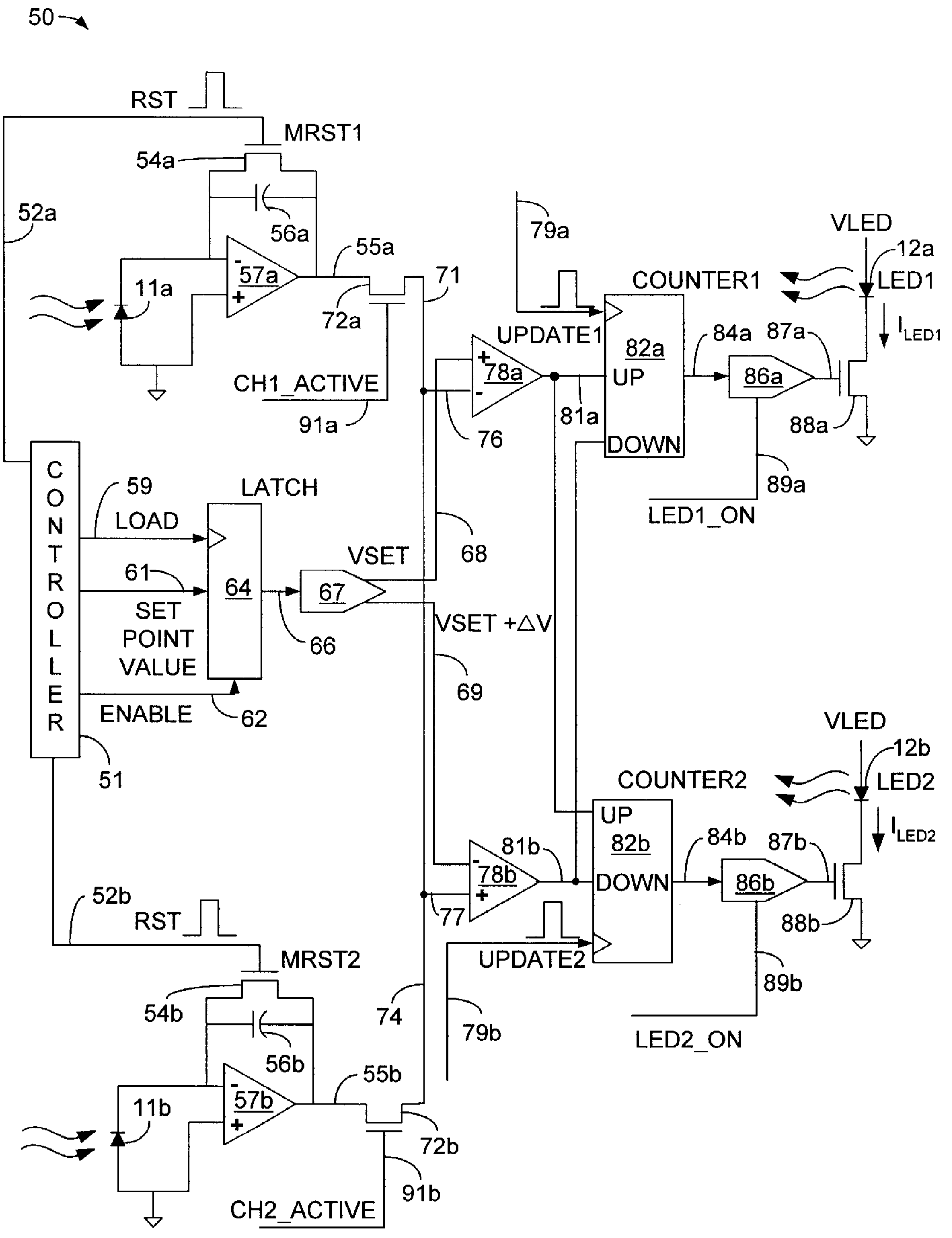
FIG. 3 is a schematic diagram of a first embodiment of the on-chip calibration circuitry of FIG. 1.

FIG. 3 is a schematic view illustrating a first embodiment of the on-chip calibration circuitry of FIG. 1. Intensity sense and control circuit 50 is illustrated in FIG. 3 using two channels, each channel controlling the intensity of a single LED. Channel 1 includes LED 12*a,* photo-detector 11*a* of FIG. 1, integrator 57*a,* transistors 54*a* and 72*a,* counter 82*a,* digital-to-analog converter (DAC) 86a and transistor 88*a*. Channel 2 includes LED 12*b,* photo-detector 11*b* of FIG. 1, integrator 5 7*b,* transistors 54*b* and 72*b,* counter 82*b,* DAC 86*b* and transistor 88*b*. Comparators 78*a* and 78*b* are common to both channels and will be described below. Furthermore, controller 51, latch 64 and DAC 67 are also common to both channels. It should be noted that although shown using two channels, intensity sense and control circuit 50 may be used to control many additional illumination sources and photo-detectors. Furthermore, photo-detectors 11*a* and 11*b,* and illumination sources 12*a* and 12*b,* while shown schematically in FIG. 3 as a part of intensity sense and control circuit 50, are not necessarily physically located therein.

In accordance with the invention, photo-detector 11*a,* which is illustrated schematically as a photo-diode that generates a current, but may be any device capable of converting light impinging on it into an electrical signal, receives light from LED 12*a*. Photo-detector 11*a* produces a current that is proportional to the number of photons impinging upon it from LED 12*a*. Operational amplifier 57*a,* which is configured as an integrator in this application, receives the current from photo-detector 11*a* and integrates it during a specified time to produce an output voltage on connection 55*a*. The voltage is proportional to the intensity of light impinging upon photo-detector 11*a*. To begin the measurement cycle, a reset signal is applied from controller 51 over connection 52*a* to reset transistor 54*a*. Controller 51 is a device that provides timing and control signals to the components of intensity sense and control circuit 50. Reset transistor 54*a* may be a metal oxide semiconductor field effect transistor (MOSFET), or any other device capable of shorting capacitor 56*a* upon receipt of a control signal from controller 51. Capacitor 56*a* is shorted to reset the output of integrator 57*a* to zero prior to photo-detector 11*a* receiving light from LED 12*a*.

Similarly photo-detector 11*b* receives light from LED 12*b* and produces a current proportional to the number of photons impinging upon photo-detector 11*b* and supplies this current to integrator 57*b*. After integrator 57*b* is reset by a reset signal supplied by controller 51 over connection 52*b* to reset transistor 54*b* in a similar fashion to that described above, integrator 57*b* provides a voltage representing the current supplied by photo-detector 11*b* over connection 55*b*.

During the time that integrators 57*a* and 57*b* measure the current generated in response to the light impinging upon photo-detectors 11*a* and 11*b,* a set point value is loaded into latch 64. The set point value is a digital value that represents the desired intensity of the illumination sources, in this case, LEDs 12*a* and 12*b*. The set point value may be either user or system defined, and represents a fixed value. For example, the set point value may be adjusted to make the display brighter or darker. This adjustment may be made using a user interface (not shown) to controller 51. There may also be a default set point value that is stored in controller 51 and loaded into latch 64 at the appropriate time. The set point value received over connection 61 is loaded into latch 64 upon receipt of a load signal over connection 59 from controller 51 and an enable signal over connection 62 from controller 51. If the set point value remains fixed, then no new set point value is loaded into latch 64.

The output of latch 64 over connection 66 is the set point value and is supplied to digital-to-analog converter (DAC) 67. The analog output voltage VSET of DAC 67 over connection 68 is an analog representation of the digital set point value on connection 66. The other output, VSET+ΔV, of DAC 67 over connection 69 is an analog representation of the set point value on connection 66 plus some offset voltage, as described above with reference to FIG. 2.

Next, depending upon whether transistor 72*a* or transistor 72*b* is made active by the CH1_ACTIVE signal or the CH2_ACTIVE signal from controller 51 over connections 91*a* or 91*b,* the comparators 78*a* and 78*b* compare either the output of integrator 57*a* over connection 71 or the output of integrator 57*b* over connection 74 with the set point value VSET on connection 68 and the VSET+ΔV value on connection 69. The function of comparators 78*a* and 78*b* is similar to the function of comparators 27*a* and 27*b* described above.

The operation of intensity sense and control circuit 50 when channel 1 is active, i.e., when controller 51 has activated transistor 72*a* via connection 91*a,* will now be described. The operation when channel 2 is active is similar and will not be described. Comparator 78*a* receives the output of integrator 57*a* over connection 76, and receives the VSET output of DAC 67 over connection 68. Comparator 78*a* compares a voltage representing the measured intensity of LED 12*a,* which is supplied over connection 76 from integrator 57*a* through transistor 72*a,* with the desired intensity, as represented by the VSET signal received over connection 68 from DAC 67. Depending upon the relative value of these two signals, the output of comparator 78a will either be a logic high or a logic low. For example, if the value of VSET over connection 68 is higher than the value of the voltage representing the measured intensity on connection 76, then the output of comparator 78a will be a logic high. Conversely, if the voltage representing the measured intensity on connection 76 is greater than the desired intensity over connection 68, then the output of comparator 78a will be a logic low. Comparator 78b operates in the opposite sense to comparator 78a. Comparators 78a and 78b are common to both channels to minimize mismatch between the channels. Because the comparators have inherent offset, using the same comparators causes all channels to have the same offset, thus minimizing mismatch between the channels.

The function of the set point values VSET and VSET+ΔV generated by DAC 67 are similar to that described above and will not be repeated.

Returning now to the discussion of the operation of counters 82a and 82b, when counter 82a receives an update signal over connection 79a from controller 51, counter 82a determines whether a logic high is present on the output of comparator 78a on connection 81a or on the output of comparator 78b on connection 81b. Similarly, counter 82b, upon receipt of its update signal over connection 79b from controller 51 determines whether a logic high is present on the output of comparator 78a on connection 81a or on the output of comparator 78b on connection 81b. If a logic high is present on connection 81a of counter 82a or 82b, counters 82a and 82b increment in response to their respective update signals. Conversely, if a logic high signal is present on connection 81b, then counters 82a and 82b decrement in response to their respective update signals. As described above with respect to FIG. 2, when neither comparator 78a nor 78b provide a logic high output, i.e., when the output of the integrators 57a and 57b are within ΔV of the set point value VSET, the states of counters 82a and 82b remain unchanged.

Alternatively, a single comparator whose output drives an up/down input on a counter may be used instead of the comparators 78a and 78b and the counter 82a. With this arrangement, the intensity of the light generated by LED 12a would then dither around the intensity corresponding to the set point value. Such a configuration may be acceptable if the time intervals between successive update signals are sufficiently small. A single comparator may also be used if the DACs and counters have sufficient resolution.

To illustrate the operation of comparator 78a & 78b and counter 82a, assume that light generated by LED 12a was too dim when measured by photo-detector 11a. In such a case, the output of integrator 57a, which is supplied to comparator 78a over connection 76, is lower than the set point value VSET on connection 68. This condition dictates that the output of comparator 78a will be a logic high, which will cause counter 82a to increment upon receipt of the update signal from controller 51. When counter 82a increments, the output 84a of counter 82a causes the digital value provided to DAC 86a over connection 84a to be higher. The signal on connection 84a is an n-bit digital word representing the current driving LED 12a. The analog output of DAC 86a over connection 87a directly drives LED 12a via current source MOSFET transistor 88a. Therefore, as the output of DAC 86a increases, the current $I_{LED1}$ will increase, thus causing LED 12a to become brighter.

Alternatively, if the light generated by LED 12a were too bright, then the output of integrator 57a would be greater than the set point value VSET on connection 68a, thereby causing the output of comparator 78a to be a logic low and the output of comparator 78b to be a logic high provided that the output of comparator 57a is higher than the value of VSET+ΔV. In the above-mentioned example in which LED 12a is too bright, the output of comparator 78b will be a logic high on connection 81b, thus causing counter 82a to decrement. When the output of counter 82a on connection 84a decrements, the input to DAC 86a is reduced in response to the new update signal, thus causing DAC 86a to reduce the amount of current $I_{LED1}$ flowing through LED 12a, thus reducing the intensity of LED 12a.

The LED1_ON input to DAC 86a over connection 89a and the LED2_ON input to DAC 86b over connection 89b originate from controller 51. These signals determine the times at which each LED turns on and off.

Returning now to the description of the outputs VSET and VSET+ΔV of DAC 67, as described above with respect to FIG. 2, a small voltage offset is added to the output of DAC 67 on connection 69 because it is desirable to have a window, or range, within which the current through neither LED 12a or 12b is adjusted. In other words, if the voltage corresponding to the measured intensity value is in a defined range above the set point value VSET, the range being defined by the value ΔV, then no intensity adjustment is desired. The use of this range is desirable because the output of integrators 57a and 57b are analog values, each of which can have an infinite number of different levels. The output of DAC 67 is also an analog value. Because these two values are compared by comparators 78a and 78b, unless some offset voltage above VSET is included, the circuit is likely to oscillate continuously between the measured intensity values from integrators 57a and 57b and the set point value VSET of DAC 67. In such a case, an undesirable amount of flicker may be visible to the viewer of the micro-display device.

To illustrate, in the case where the value VSET of DAC 67 on connection 68 is higher than the output of comparator 57a, then counter 82a is incremented to increase the brightness of LED 12a. If the value VSET on connection 68 is lower than the value at the output of integrator 57a, but not lower by more than the amount ΔV, then the output of comparator 78b does not change state. The value ΔV can be a fixed value or indeed may be user defined. The value of ΔV defines the window within which no adjustment is made, thereby significantly reducing the amount of flicker visible to a viewer of the micro-display device.

One LED measurement can be performed during every frame of the video signal displayed by the display device, with the measurements of all the channels being time multiplexed to occur within the time period of one frame. In other words, the steps of comparing the integrated values and incrementing or decrementing the counters occurs in less time than the time period of one frame. After several frames, the values output by the counters 82a and 82b will converge on the value that sets the LEDs 12a and 12b to their required intensity. It should be mentioned that DAC 67 and DACs 86a and 86b should be monotonic, meaning that for each bit increase or decrease in the input, the output of each DAC will increase or decrease in the same direction as the input increases.

DACs 86a and 86b are located in a feedback loop so that their linearity requirements may be relaxed. Furthermore, DAC 67 is shared between the two channels so that its accuracy requirements may also be relaxed. To match the two channels depicted in FIG. 3 precisely, integrators 57a and 57*b* should have minimal offset, capacitors 56*a* and 56*b* should match, and the output of photo-detectors 11*a* and 11*b* for a given intensity of illumination should match. As stated above, because the comparators have inherent offset, using the same comparators causes all channels to have the same offset, thus minimizing mismatch between the channels.

Another situation in which the invention is useful is where it is desirable to compensate for ambient light conditions. By using the photo-detector 11*a* and the integrator 57*a* to measure the light intensity during LED off times, the ambient light intensity may be derived. The measured ambient light intensity may then be used to preset capacitors 56*a* and 56*b*, thereby allowing LEDs 12*a* and 12*b* to be driven to a higher intensity level for high ambient light conditions. Furthermore, in the case of a head-mounted eyeglass display, the above-described ambient light detection may be used to determine whether the display is being worn. The detection of a high ambient light level indicates that the display is probably not in use, and may be shut off or placed in a stand-by mode to conserve power.

Figure 4:
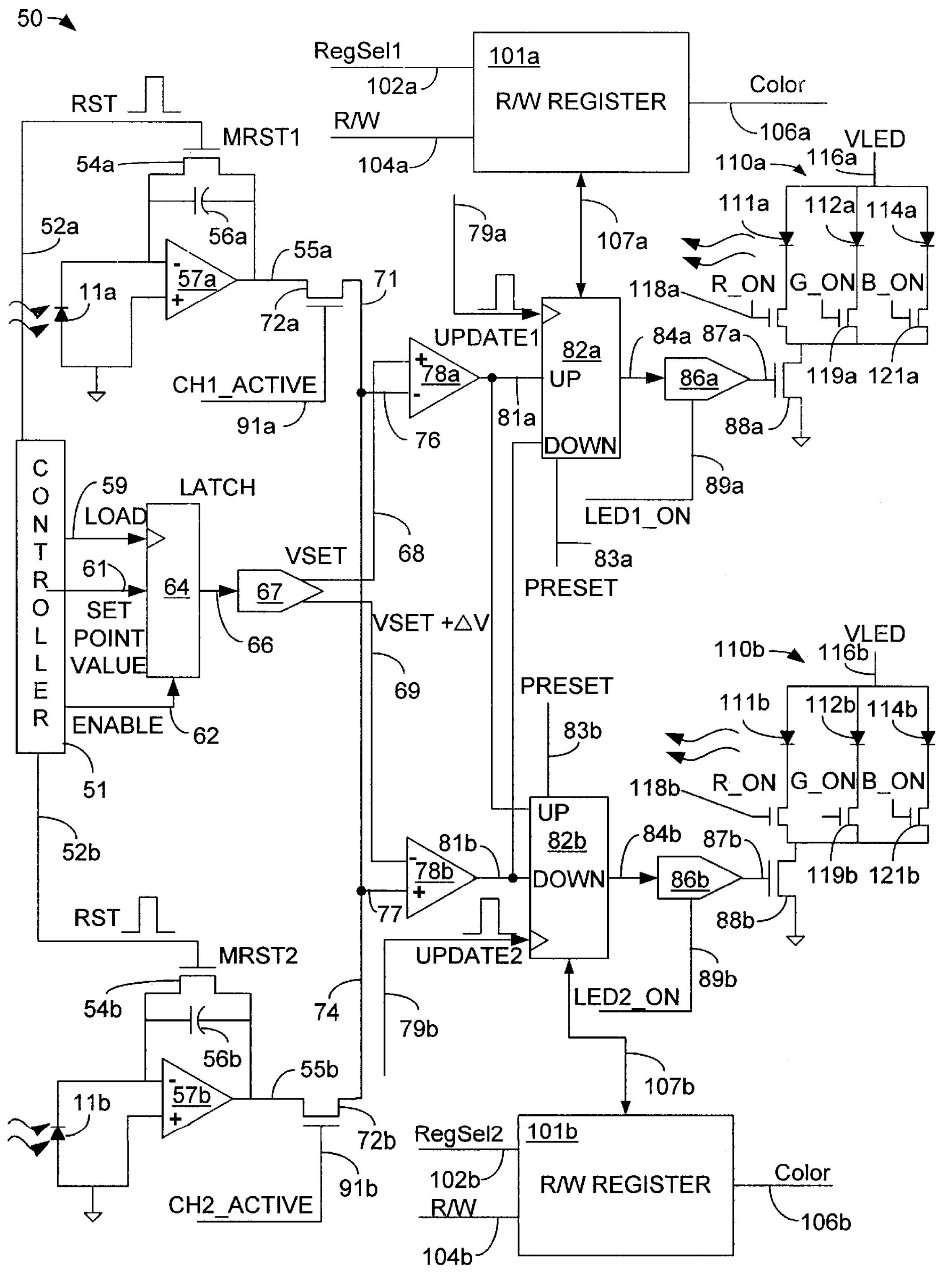
FIG. 4 is a schematic diagram of a preferred embodiment of the on-chip calibration circuitry of FIG. 1.

It should be noted that by replicating the structures depicted in FIG. 3, the depicted architecture may be extended to additional channels. To extend the depicted architecture to control LEDs generating different colors in a color display, circuitry to turn on the proper LED at the proper time and circuitry to hold the value for each color for the counters, as will be described below with respect to FIG. 4, is necessary. The photo-detector and integrator structures may be reused for each color. Errors in the wavelength response may be compensated for in the set point values for the different colors.

FIG. 4 is a schematic diagram of a preferred embodiment 100 of the on-chip calibration circuitry of FIG. 1. Intensity sense and control circuit 100 is used in multiple color, multiple illumination source display applications. The embodiment illustrated in FIG. 4 includes red, green and blue illumination sources 110*a* and 110*b*, which will be described in detail below. Components that are similar to those in FIG. 3 are like numbered and will not be described again. Intensity sense and control circuit 100 includes read/write (R/W) registers 101*a* and 101*b* in channels 1 and 2, respectively. R/W registers 101*a* and 101*b* are M×N registers, where M is the number of colors collectively generated by the LEDs 111*a/b*, 112*a/b* and 114*a/b* (three in this embodiment), and N refers to the bit-width of the counter 82*a* associated with the R/W register 101*a*. Illumination source 110*a* includes red LED 111*a*, green LED 112*a* and blue LED 114*a*. The LEDs are connected in parallel between voltage source VLED on connection 116*a* and transistor 88*a*. The LEDs in illumination source 110*b* are similarly connected.

The operation of R/V register 101*a* and illumination source 110*a* will be described. The operation of R/W register 101*b* and illumination source 110*b* is similar and will not be repeated.

Because light of the different colors is generated independently, the values representing the currents supplied to the LEDs generating the light of the different colors stored in counter 82*a* are different for each color. Prior to enabling each LED, the value used in the prior frame for that LED is recalled from the R/W register 101*a* and loaded into the counter 82*a* via connection 107*a*. Upon receipt of a PRESET signal from controller 51 over connection 83*a* the value corresponding to the current color from the previous cycle for that color is read out of R/W register 101*a* and loaded into counter 82*a*. The PRESET signal corresponds to the RST signal, which is used to reset the integrators 57*a* and 57*b*. The LED is then enabled at the appropriate time and the integration of the photo-detector output is performed. At the end of each illumination period, the controller 51 enables the CH1_ACTIVE signal, which enables the computation of the correction signal as described above. After the correction has been performed, the new value is stored in R/W register 101*a* before the value for the next color is loaded. The cycle then repeats for the next color.

Control of illumination source 110*a* is performed by transistor 88*a* upon receipt of the appropriate signal from DAC 86*a*, in conjunction with the appropriate R_ON, G_ON, or B_ON signal supplied to transistors 118*a*, 119*a* or 121*a*, respectively, by controller 51. These signals control the on time of LEDs 111*a*, 112*a*, or 114*a*, respectively, and will be described in detail below with reference to FIG. 5.

Figure 5:
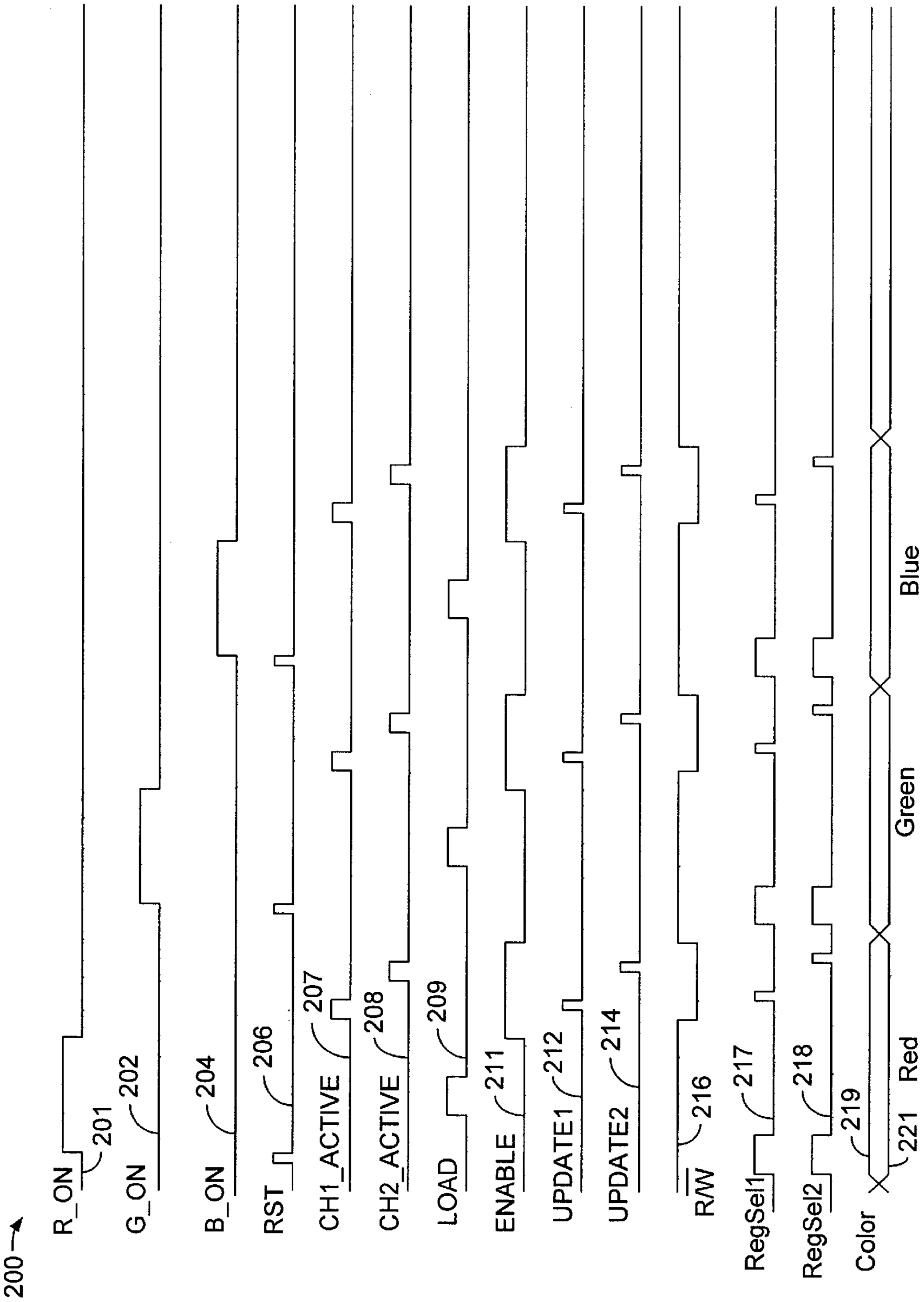
FIG. 5 is a timing diagram illustrating the operation of the on-chip calibration circuitry of FIG. 4.

FIG. 5 is a timing diagram 200 illustrating the operation of the on-chip calibration circuitry of FIG. 4.

The signals R_ON 201, G_ON 202, and B_ON 204 correspond to the times when transistors 118*a*, 119*a* and 121*a* (FIG. 4) are made active, and furthermore correspond to the times when the respective LEDs connected to those transistors are on. Reset signal RST 206 is supplied over connection 52*a* from controller 51 to transistor 54*a*, and the CH1_ACTIVE signal 207 and the CH2_ACTIVE signal 208 are supplied to transistors 72*a* and 72*b* of FIG. 3, respectively. The RST signal resets integrators 57*a* and 57*b*, and the CH1_ACTIVE and the CH2_ACTIVE signals determine when comparators 78*a* and 78*b* receive the outputs of integrators 57*a* and 57*b*. The LOAD signal 209 is supplied by controller 51 to latch 64 over connection 59.

The ENABLE signal 211 is supplied from controller 51 to latch 64 via connection 62 to enable to output of latch 64 to be supplied to DAC 67, and the UPDATE1 signal 212 and the UPDATE2 signal 214 are supplied to counters 82*a* and 82*b* via connections 79*a* and 79*b*, respectively, to update the counters with the new intensity values. Each counter will increment, decrement, or remain unchanged when the respective UPDATE signal is asserted, depending on whether the outputs of comparators 78*a* and 78*b* supplied over connections 81*a* and 81*b*, respectively, are logic high or logic low, as previously described. The R/W signal 216 is supplied from controller 51 to R/W register 101*a* via connection 104*a*, and to R/W register 101*b* over connection 104*b*.

When the R/W signal 216 is logic high, the R/W registers 101*a* and 101*b* are in read mode and the value stored in the registers is loaded into the corresponding counters 82*a* and 82*b*, respectively. When the R/W signal 216 is logic low, the value in counter 82*a* is stored into R/W register 101*a* and the value in counter 82*b* is stored into R/W register 101*b*.

The RegSel1 signal 217 and the RegSel2 signal 218 are supplied to R/W register 101*a* and R/W register 101*b* over connections 102*a* and 102*b* respectively. These signals determine the time when the value stored in each register for the particular color LED is transferred to the corresponding counter. The color signals 219 and 221 are addresses that are supplied by controller 51 over connections 106*a* and 106*b*, respectively, and determine which of the M words in R/W registers 101*a* and 101*b* are supplied to counters 82*a* and 82*b*, respectively. In this manner, the intensity of color displays having multiple illumination sources and multiple colors per illumination source may be continuously monitored and adjusted.

It will be apparent to those skilled in the art that many modifications and variations may be made to the preferred embodiments of the invention, as set forth above, without departing substantially from the principles of the invention. For example, the on-chip calibration circuitry may be used in applications having light sources other than LEDs and photo-detectors other than photo-diodes. Furthermore, the invention is also useful in a multiple color application in which N counters, where N is the number of colors, and an N:1 multiplexer at the input to the LED driver DACs are used in place of the R/W registers described in FIG. 4. In this manner, a dedicated counter for each color is used to drive a corresponding LED. The multiplexer selects the appropriate counter for each color at the appropriate time. Furthermore, while described in the context of measuring and adjusting the intensity of an illumination source that is illuminating an integrated circuit display, the concept of the invention may easily be extended to an integrated circuit having an illumination source as part thereof. All such modifications and variations are intended to be included herein within the scope of the invention, as defined in the claims that follow.

What is claimed is:

1. A method for calibrating an illumination source, the method comprising the steps of:

providing an integrated circuit including an imaging array, at least one photo-detector and an intensity sense and control circuit;

illuminating said imaging array and at least one photo-detector using the illumination source;

measuring an intensity of said illumination source using said photo-detector;

communicating said intensity to said intensity sense and control circuit; and adjusting said illumination source to a predetermined level using said intensity sense and control circuit.

2. The method of claim 1, wherein said illumination source is a light emitting diode (LED).

3. The method of claim 1, wherein said photo-detector detects the intensity of said illumination source.

4. The method of claim 1, wherein said step of adjusting said illumination source further comprises the step of increasing or decreasing a drive current to said illumination source.

5. The method of claim 1, wherein said photo-detector is co-located with said intensity sense and control circuitry.

6. The method of claim 1, wherein said integrated circuit includes said illumination source.

7. A system for calibrating an illumination source, comprising:

an integrated circuit including an imaging array and a photo-detector;

an illumination source optically coupled to said imaging array; and circuitry resident on said integrated circuit, said circuitry including intensity sense circuitry coupled to said photo-detector and control circuitry coupled to said illumination source.

8. The system of claim 7, wherein said photo-detector is a photo-transistor.

9. The system of claim 7,wherein said illumination source is a light emitting diode (LED).

10. The system of claim 7, wherein said intensity sense circuitry further comprises:

a first amplifier coupled to said photo-detector; and a second amplifier configured to receive the output of said first amplifier and a signal representing a predetermined intensity level of said illumination source.

11. The system of claim 7, wherein said integrated circuit includes said illumination source.

12. The system of claim 10, wherein said control circuitry further comprises:

a counter coupled to said second amplifier;

a digital-to-analog converter (DAC) coupled to said counter; and a transistor coupled to said DAC and said illumination source.

13. The system of claim 12, wherein said illumination source includes a plurality of LEDs and said control circuitry further comprises:

a register coupled to said counter for storing a value corresponding to an intensity of each of said plurality of LEDs.

* * * * *